Oct. 29, 1929.  P. A. H. MOSSAY  1,733,356
MOTOR PROPELLED CRANE
Original Filed Aug. 10, 1921  4 Sheets-Sheet 1
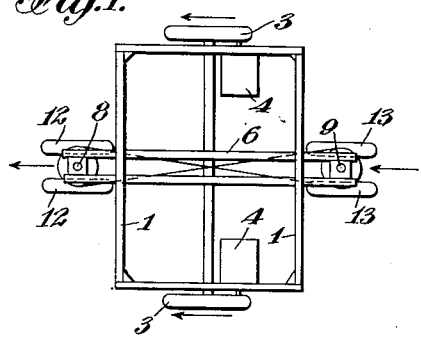
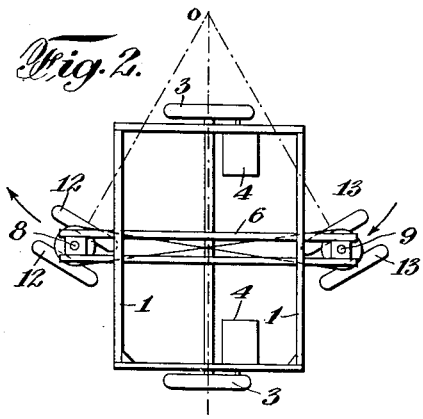
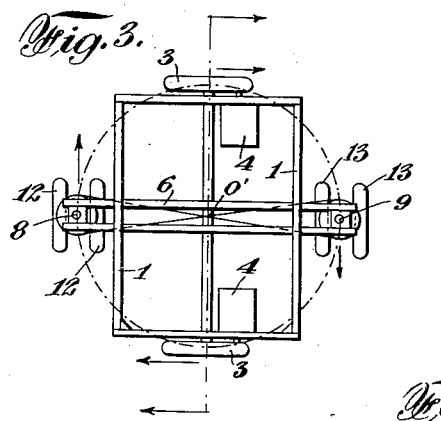
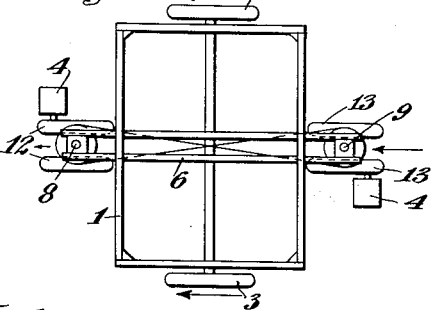
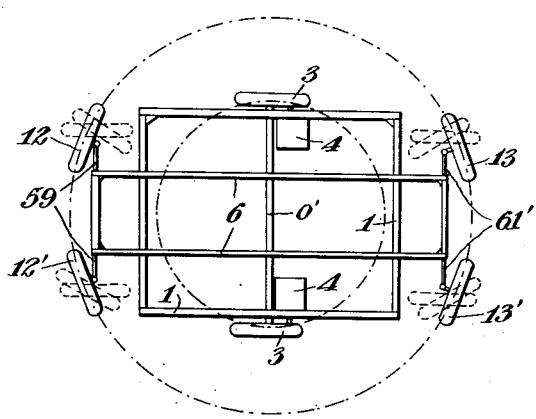

Oct. 29, 1929.                    P. A. H. MOSSAY                    1,733,356
                              MOTOR PROPELLED CRANE
                     Original Filed Aug. 10, 1921      4 Sheets-Sheet 2

Inventor
Paul A. H. Mossay
By his Attorneys

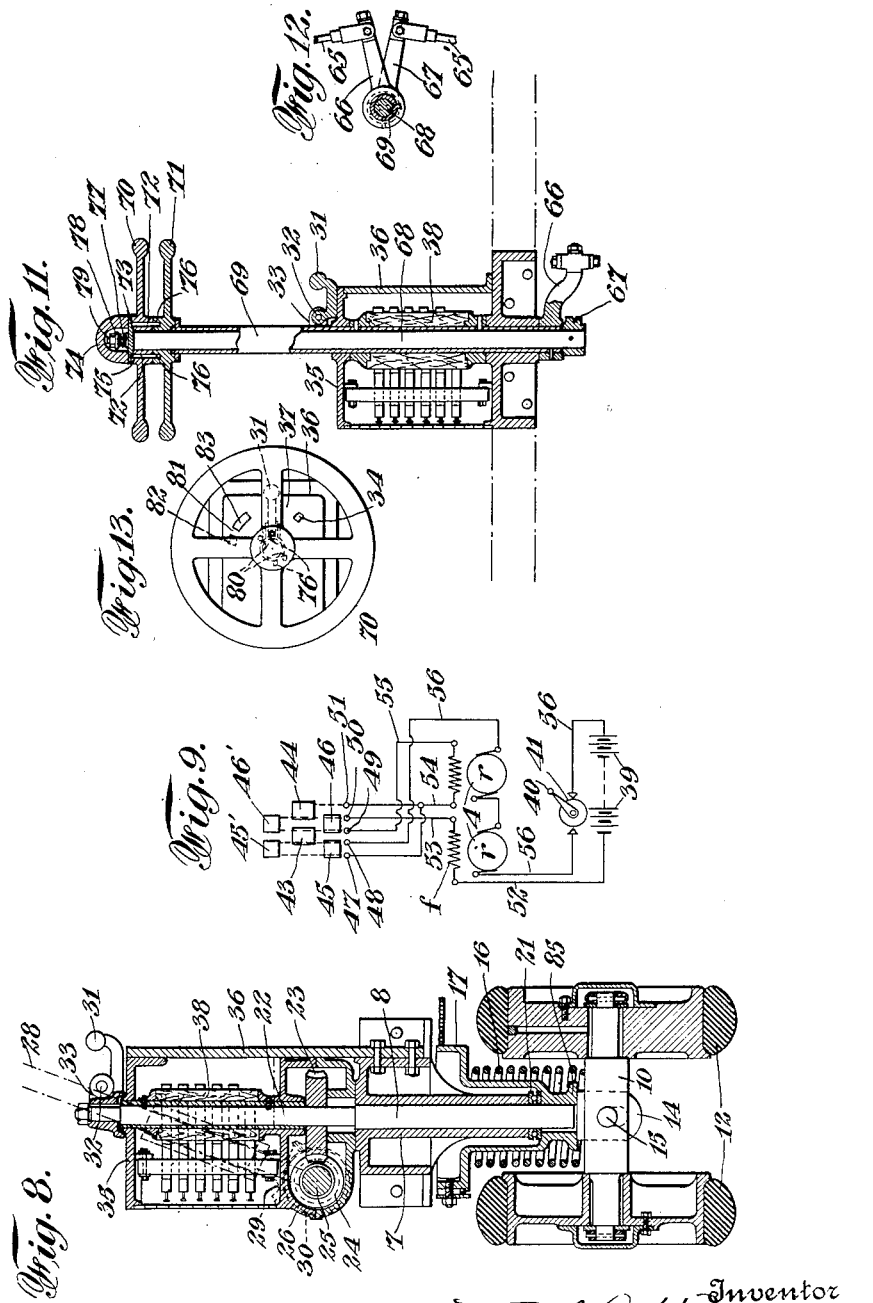

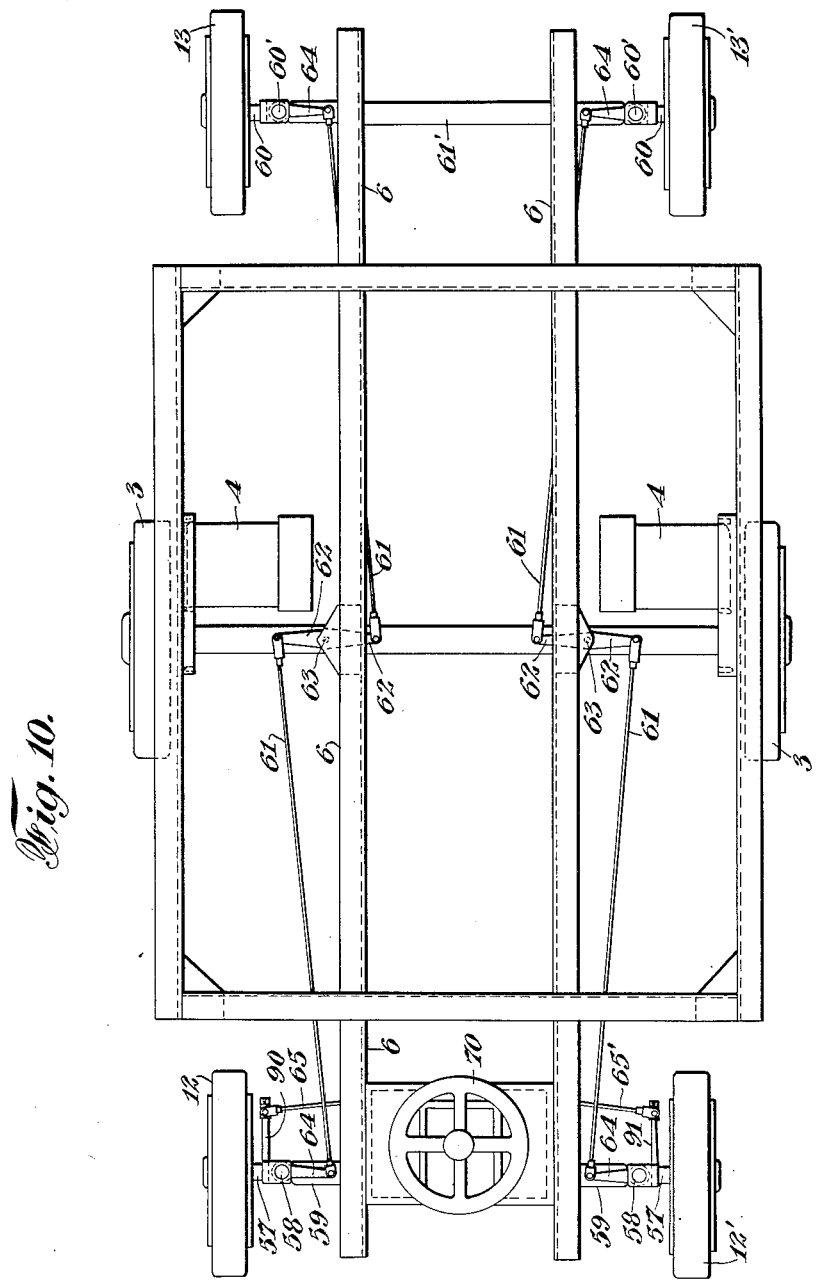

Patented Oct. 29, 1929

1,733,356

UNITED STATES PATENT OFFICE

PAUL ALPHONSE HUBERT MOSSAY, OF LONDON, ENGLAND, ASSIGNOR TO MOSSAY & COMPANY, LIMITED, OF LONDON, ENGLAND, A CORPORATION

MOTOR-PROPELLED CRANE

Original application filed August 10, 1921, Serial No. 491,099, and in Great Britain April 29, 1921. Divided and this application filed June 10, 1926. Serial No. 114,924.

This invention consists in a railless motor propelled vehicle, which can be rotated, in either direction about a centre situated within its wheel base, and also can be made to travel or oscillate in any desired direction, either in a straight line or on a curve, under the control of the operator.

While the invention is capable of general application, it is particularly suitable for use as a combined chassis and turntable for an automobile crane, the universal steering movements of the table enabling a derrick to be a fixture thereon and avoiding the necessity for the usual accessory motor and gear, hitherto provided in a locomotive or automobile crane for slewing the derrick relatively to the carriage or chassis. There may be, moreover, a fixed relation between the maximum overhang of the derrick, or load, and the wheel base in all positions of the crane during slewing, whereby a much lighter construction may be adopted than hitherto.

According to the invention a platform, turntable, or open frame structure, for convenience hereinafter termed the chassis, is provided with road wheels of sufficient number and adequate relative disposition to render the chassis stable under the loads it is intended to carry during any steering, oscillatory or rotary movements of the chassis, and with motive power and suitable transmission gearing by which some of the road wheels can be driven, under the control of the operator, in such direction as to propel the chassis either ahead or astern, or on curves about steering centres situated outside the wheel base of the chassis, or as to set up a couple tending to rotate the structure in either of two directions about an imaginary centre situated within the wheel base of the vehicle.

The invention includes the provision of steering mechanism by which some of the road wheels may be swivelled or set, and if necessary, locked in determined positions against swivelling in order to control or influence the rectilinear, curvilinear and rotational movements of the structure.

In order that the vehicle can rotate about a centre situated within its wheel base it is necessary that all the road wheels be set tangentially to circular tracks having their geometrical centres coinciding with the centre of rotation of the vehicle, in other words all the road wheels must be set at right angles to radii from a common centre which is the centre of rotation of the vehicle, and which may be termed a common planetary centre for the road wheels as they all revolve about it while rotating on their own axis. In order to ensure automatic stability there should be at least three road wheels, and in order to set up a couple tending to rotate the vehicle about the common planetary centre, at least two road wheels, on opposite sides of the centre should be rotated by suitable motive power. As the vehicle is sometimes required to make translational movements, relatively to said centre, for instance rectilinear movements ahead or astern, or on curves about centres outside the wheel base, it is necessary that some of the wheels at least shall be capable of being set or adjusted relatively to the others and, although they may be safely controlled by hand for ordinary steering, it is desirable that they be locked in their adjusted position against swivelling when the vehicle is rotating about a centre within the wheel base. A simple form of vehicle meeting these conditions is apparently one having three road wheels adapted to be set at right angles to radii or geometrical axes radiating from a common planetary centre, (the radii being preferably but not necessarily spaced at 120° apart), two of these wheels being driving wheels, but in practice, as the vehicle is to be loaded unevenly, it is desirable to increase the stability by the provision of more than three wheels.

Several practical embodiments of the invention will now be described by way of example. In the drawings:—

Figures 1, 2 and 3 are diagrammatic plans illustrating one form of chassis according to the invention with its road wheels set for rectilinear, curvilinear and rotational movements respectively.

Figure 4 is a similar plan to Figure 1 of another form,

Figure 5 is a plan of a further form, the steering wheels being indicated in full lines as set for rotational movements of the chassis, in dotted lines for curvilinear and in dot-and-dash lines for rectilinear movements.

Figure 8 is a side sectional elevation of the front steering wheels, turned into positions for rotational movements of the chassis, the steering column and the electric controller mounted thereon.

Figure 9 is a diagram of electric connections for the motors.

Figure 10 is a plan of another form of chassis similar to that indicated diagrammatically in Figure 5.

Figure 11 is a sectional elevation of the steering column of this form of chassis.

Figure 12 is a plan of a detail connected with the steering rods, and

Figure 13 is a plan of the steering locking device and indicator.

Figure 6:
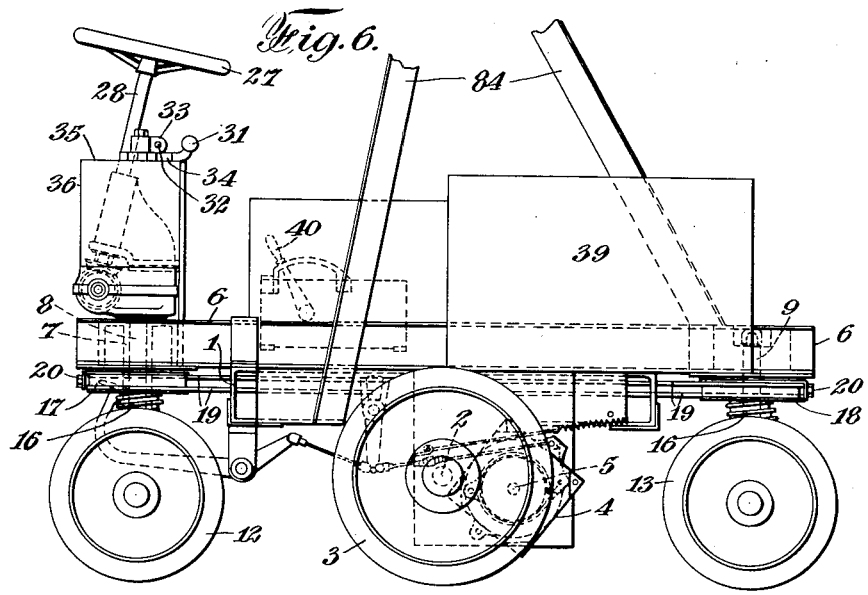
Figure 6 is a side elevation of one form of automobile chassis according to the invention, suitable for an automobile crane, part only of the crane derrick being shown as it may be of any suitable construction well known in the art of crane making.
Figure 7:
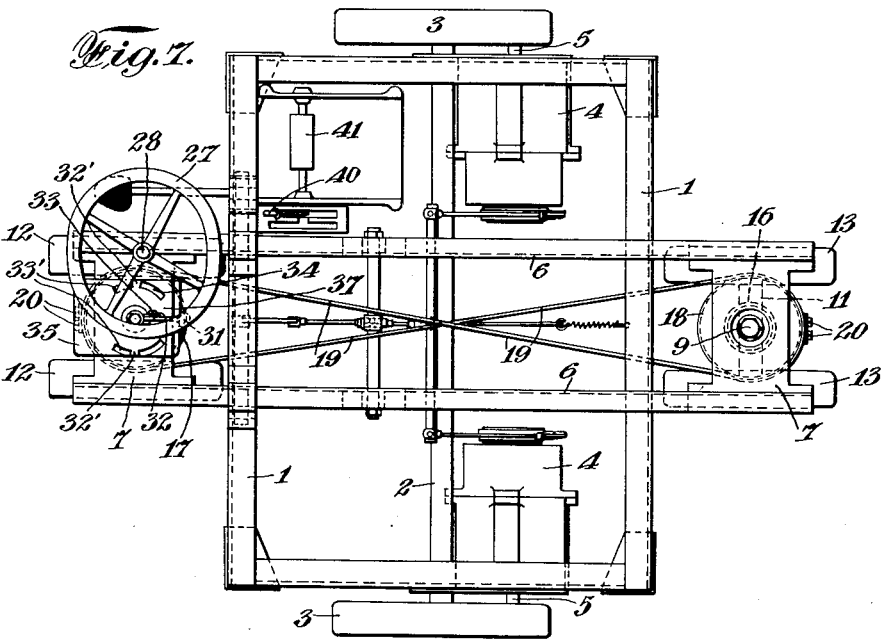
Figure 7 is a plan corresponding to Figure 6 but with the derrick and some other parts omitted in order to show more clearly the more essential features of the invention.

In the form of automobile crane illustrated by Figures 6, 7 and 8 the main frame 1 is provided with a fixed axle 2 fitted with driving road wheels 3, driven by electric motors 4, off the motor shafts 5, in any suitable manner well known in the art of electric traction. The frame 1 has longitudinal girders 6, to which bearings 7, are rigidly connected for the reception of vertical pivotal shafts 8 and 9, for the axles 10 and 11 of front and rear steering road wheels 12 and 13 respectively. The pivotal shafts 8 and 9 have slotted forked lower ends 14, Figure 8, embracing the axles 10 and 11 and connected thereto by cross-pins 15 so that although limited relative vertical movement is possible between the pivotal shafts 8, 9, and the axles 10, 11, each axle is compelled to share in the rotary movements of the shaft to which it is connected. The steering road wheels 12 and 13, are free to rotate on the axles 10 and 11. Relative vertical movement to allow for inequalities in the road surface is checked by springs 16 which abut at the lower ends against the axles 10 and 11 and at their upper ends against the undersides of pulleys 17 and 18 keyed on the pivotal shafts 8 and 9.

The front and rear steering road wheels are connected so that they are compelled to rotate about their pivotal shafts in unison, but in opposite directions for instance the two pulleys 17 and 18 are connected by a crossed cable 19 anchored to the pulleys 17, 18 by screws 20. A ball thrust washer 21 is preferably provided between each bearing 7 and the boss 85 of the adjacent pulley 17 and that of the adjacent pulley 18.

The pivotal shaft 8 is adapted to be rotated by the operator to effect the steering of the crane and also when required, to effect slewing of the crane, for example the shaft 8 has an extension 22 fitted with a worm wheel 23 meshing with a worm 24 on a shaft 25 suitably supported in a casing 26 rigidly mounted on the bearing 7 of the shaft 8. The shaft 25 is rotated, by the operator, through a hand steering wheel 27 on a steering post 28 fitted with a bevel wheel 29 meshing with a bevel wheel 30 on the worm shaft 25. A pawl 31 pivoted on a pin 32 carried by a lug 33 fixed on the upper end of the extension 22 of the pivotal shaft 8 indicates to the operator the angular movement of the pivotal shaft 8 and the position of the front steering road wheels 12. It also acts as a lock for positively holding the steering road wheels against swivelling when they are rotated about their pivotal shafts through an angle of 90° for slewing purposes, for instance, when the operator through the medium of the hand steering wheel 27, rotates the steering road wheel 12 into this position he raises the pawl 31 and allows it to fall into either of two diametrically opposite slots 32′ between lugs 33′, 34, formed on the top 35 of a casing 36 bolted to the adjacent bearing 7.

During rectilinear or curvilinear movements of the automobile crane, the pawl 31 is free to oscillate in the space 37 between the two lugs 34.

During the ordinary driving and steering, or rectilinear and curvilinear translational movements of the automobile crane the two driving road wheels 3 are rotated in the same direction but when the crane is to make a rotational movement about a centre situated within its wheel base for slewing purposes, that is when the steering road wheels have been rotated through 90° about the pivotal shafts 8 and 9, the driving road wheels 3 are rotated relatively in opposite directions. It is preferred to effect this relative reversal of the driving wheels simultaneously and automatically with the adjustment of the steering road wheels. For this purpose the extension 22 of the pivotal shaft 8 is fitted with the contact drum 38 of a suitable electric controller in electrical connection with the motors 4 and with the source of current, such as an accumulator 39, controlled by a main controller the operating handle 40 and contact drum 41 of which are indicated in Figures 6 and 7 and 9. The details of the main controller 41 need no further description here as they are well known in the art of electric traction. In the electrical diagram, Figure 9, $r$ and $f$ represent the rotors and fields respectively of the two motors 4 for the driving road wheels, 41 the main controller and 39 the accumulator.

The contacts of the controller drum 38 are diagrammatically shown in three sets, one set 43, 44 for use for rectilinear and curvilinear translational movements of the automobile crane, and two sets 45, 46 and 45', 46', for rotational movements of the crane about its centre for slewing purposes, these two sets being arranged on the drum 38 at 90° on either side of the former set. 47, 48, 49, 50, 51 are the brushes for the contacts. Assuming that the vehicle or automobile crane is to travel ahead in a straight line, the operator sets the steering road wheels 12, 13 parallel to the driving road wheels 3 (as diagrammatically indicated in Figure 1) and moves the operating handle 40 of the main controller to close the electric circuit. The contacts 43 and 44 are then in contact with the brushes 48, 49 and 50, 51 and current flows from the accumulator 39 through lead 52, field $f$ of one motor 4, lead 53, brush 50, contact 44, brush 51, lead 54, the field $f$ of the other motor 4, lead 55, brush 49, contact 43, brush 48, lead 56 and thence in series through the rotors $r, r$, of the motors, and the main controller 41 back to the accumulator 39. The motors thus rotate the driving road wheels in the same direction and the vehicle moves ahead. If it is to be driven astern the operator moves the handle 40 in the opposite direction so as to bring a second series of contacts on the main controller drum 41 into operation so as to effect a reversal of the current in the two armatures of the motors, no details of this arrangement being necessary as it is well known in the art of electric traction.

When the operator wishes to steer the crane, for instance about a centre $o$ Figure 2, outside the wheel base of the vehicle, he merely operates the steering wheel 27 as usual in steering automobiles and so long as the movements are within the range allowed by the pawl 31 in the space 37, between the lugs 34, the motors 4 are driven in the same direction, the contacts 43, 44, being wide enough to maintain connection with the brushes 48, 49, and 50, 51.

When the operator wishes to slew the crane that is to make it rotate about a centre $o'$ Figure 3, he rotates the steering wheel in one direction or the other, until the steering road wheels have been rotated into position tangential to the circular track they are to follow, namely in the form of vehicle above described they assume positions at right angles to their former positions when the vehicle was travelling direct ahead. In this position either of the sets of contacts 45, 46 or 45', 46' will be in contact with the brushes 47, 48 and 49, 50, whereupon, if the operator moves the operating handle 40 of the main controller forward to close the circuit, current flows from the accumulator 39 in series through the motors, but the flow through the field of one motor is reversed. The driving road wheels 3 then rotate in opposite directions for instance as indicated diagrammatically in Figure 3, whereupon a couple will be set up about the centre $o'$, and the vehicle will rotate about that centre. The direction of rotation can be controlled by the operator reversing the current flow by moving the handle 40 backwards beyond the neutral position at which the current is interrupted and bringing another set of contacts into action.

In another form of the invention the steering road wheels may be also the driving road wheels, for instance as indicated in Figure 4, the steering road wheels 12, 13 are indicated as provided with electric motors 4, in a self contained manner well known in the art of electric traction. The steering road wheels 12, 13 are otherwise similarly mounted and controlled to those described above with reference to Figures 6, 7 and 8. In this arrangement the steering road wheels being driven instead of the side road wheels 3, it is no longer necessary to reverse the motors when the vehicle is to be rotated about its centre for slewing purposes and the steering road wheels are set tangential to the circle of rotation.

In a further form of the invention, for instance as shown in Figures 5 and 10 to 13 inclusive the front and rear steering road wheels 12, 12', 13, 13' are mounted separately on stub axles similarly to the usual method of mounting the steering road wheels of automobiles. The stub axles 57 of the front wheels 12, 12' are pivoted at 58 to a fixed axle 59 secured to the longitudinal girders 6. The stub axles 60 of the rear steering road wheels 13, 13' are pivoted at 60' to a fixed axle 61' secured to the girders 6. The front and rear stub axles 57 and 60 on each side of the vehicle have levers 64 which are connected together by rods 61 and rocking levers 62 pivoted at 63 to the girders 6. The stub axles 57 of the front steering road wheels 12, 12' also have levers 90, 91 which are connected by rods 65, 65' to two levers 66 and 67 respectively mounted on an inner steering post 68 and an outer steering post or sleeve 69. The two steering posts 68, 69 are respectively provided with hand steering wheels 70, 71 which are capable of independent movement, but are adapted to be locked together by a clutch under the control of the operator so that they are locked and move together. The clutch in the simple form shown comprises pins 72 carried by a plate 73 secured to a cap 74 and adapted to slide through holes 75 in the steering wheel 70 and into recesses 76 in the steering wheel 71. A spring 77 abutting against the plate 73 and a washer 78 on a stud 79 on top of the steering post 68, holds the clutch in engagement. During normal driving and steering of the vehicle the clutch locks the two steering wheels together so that if either be rotated the front and rear steering road wheels 12, 12', 13, 13' all move in unison, for example as indicated in Figure 5 by dot-and-dash lines for straight ahead and rearward travel and in dotted lines for steering to the left. If now it be desired to rotate the vehicle about its centre o', Figure 5, the operator grips and raises the cap 74, Figure 11, to disengage the clutch pins 72 from the under steering wheel 71 and turns the latter slightly so that the clutch is held out of engagement. He then rotates the two steering wheels 70, 71, independently in opposite directions until all the steering road wheels 12, 12', 13, 13' are set tangentially to the circle of rotation or circular track which they are to follow. When the steering wheels 70, 71 are in the correct relative positions corresponding to this position of the road steering wheels the clutch pins 72 enter a second set of holes 80 in the lower steering wheel 71 so that the two steering wheels are again locked together. They are also locked in position by a pawl 31 being dropped by the operator into a slot 81 between two lugs 82, 83, on the casing 36. The pawl 31 is pivoted on a pin 32 carried by a lug 33 on the steering post 69. During normal steering movements of the vehicle the pawl 31 oscillates in the space 37 in the space between lugs 34 and 83. It therefore acts also as an indicator to the driver.

The steering post 69 carries an electric controller contact drum 38 for controlling the motors 4 of the driving road wheels 3 as in the form of the invention hereinbefore described with reference to Figures 6 to 8.

When the steering road wheels have been set by the operator in positions tangential to the circular track about the centre (o', Figure 5) and the motors 4 rotate the wheels 3 in opposite directions, the vehicle as a whole rotates about the centre o'. The vehicle is provided with a main controller including means for reversing the direction of the current flow as in the form of vehicle before described, so that the operator can slew or rotate the vehicle in either direction at will.

In places where wooden or other floors limit the wheel pressure per wheel the driving wheels at the sides may be twin wheels mounted similarly to the twin steering wheels hereinbefore described, except that no vertical play should be allowed.

It will be understood that the invention is capable of many applications. In the application to an automobile crane a derrick is erected on the chassis or vehicle, for instance part of a derrick 84 is shown in Figure 6 as the construction of the derrick may be of any known type.

The invention is not limited to any particular form of motor for driving the road wheels, an electric motor being given above merely as an example.

This application is a division of my co-pending application Serial Number 491,099, filed August 10, 1921.

I claim:

1. The running gear of a crane truck adapted to support a crane comprising in combination, a chassis, road wheels on which the chassis is mounted, said road wheels being non-swivelling and arranged at opposite sides of said crane, electric motors for driving said wheels, a steering road wheel at one end of said crane, a vertical pivotal shaft operatively connected to the steering road wheel for the purpose of swivelling said wheel, hand steering mechanism for rotating said pivotal shaft, and an electric controller drum rotated by said pivotal shaft, for the purpose of automatically effecting relative reversal of the electric motors, on opposite sides of the crane when the steering road wheel is moved by said pivotal shaft into their position of maximum swivelling movement, substantially as and for the purpose hereinbefore set forth, the automobile crane being thereby constructed to revolve the hoisted load and shift it in any direction.

2. The running gear of a crane truck adapted to support a crane comprising in combination, a chassis, driving non-swivelling road wheels carried by opposite sides of said chassis, a swivelled steering road wheel for said chassis, a pair of independent electric motors for rotating said driving road wheels in the same and in opposite directions, an electric controller for controlling said motors, steering mechanism for swivelling said steering road wheel and for operating said controller, thereby effecting automatic relative reversal of said electric motors when the steering road wheel is moved into position of maximum swivelling movement, substantially as and for the purpose hereinbefore set forth, the automobile crane being thereby constructed to revolve the hoisted load and shift it in any direction.

3. The running gear of a crane truck adapted to support a crane comprising in combination, a chassis, non-swivelling, driving road wheels carried by opposite sides of said chassis, a swivelled steering road wheel for said chassis, a pair of independent electric motors for rotating said driving road wheels in the same and in opposite directions, an electric controller for controlling said motors, steering mechanism for swivelling said steering road wheel and for operating said controller, thereby effecting automatic relative reversal of said electric motors when the steering road wheel is moved into position of maximum swivelling movement, and a main controller for reversing the current, substantially as and for the purpose hereinbefore set forth, the automobile crane being thereby constructed to revolve the hoisted load and shift it in any direction.

4. In a truck, the combination of a rectangular frame, a pair of bars secured in parallelism fore and aft on said frame, non-swivelling road wheels mounted at the sides of said frame, bearing members secured to the end portions of said parallel bars, vertical shafts mounted on said bearing portions, axles carried horizontally by said shafts, pairs of road wheels, one pair mounted on the end portions of each axle, and means for turning said shafts and axles so as to move the pairs of wheels mounted thereon into and out of parallelism with the non-swivelling wheels.

5. In a truck, the combination of a rectangular frame, a pair of bars secured in parallelism fore and aft on said frame, non-swivelling road wheels mounted at the sides of said frame, bearing members secured to the end portions of said parallel bars, vertical shafts mounted on said bearing portions, said shafts being forked and slotted at their lower ends, axles provided with pins adapted to the slotted forks, springs co-operating with said axles, pairs of road wheels, one pair mounted on the end portions of each axle, and means for turning said shafts and axles so as to move the pairs of wheels mounted thereon into and out of parallelism with the non-swivelling wheels, said means comprising a cross shaft connected by a worm wheel to one of said vertical shafts, and hand operative means effective on said cross shaft.

6. In a truck, the combination of a rectangular frame, a pair of bars secured in parallelism fore and aft on said frame, non-swivelling road wheels mounted at the sides of said frame, bearing members secured to the end portions of said parallel bars, vertical shafts mounted on said bearing portions, said shafts being forked and slotted at their lower ends, axles provided with pins adapted to the slotted forks, springs co-operating with said axles, pairs of road wheels, one pair mounted on the end portions of each axle, and means for turning said shafts so as to move the pairs of wheels mounted thereon into and out of parallelism with the non-swivelling wheels, said means comprising a cross shaft connected to one of said vertical shafts a steering post connected to said cross shaft, and a hand wheel supported on said post, said steering post being inclined with respect to the associate vertical shaft and disposed at one side thereof.

7. The running gear of a crane truck adapted to support a crane comprising in combination a chassis, road wheels on which the chassis is mounted, two of which constitute side road wheels mounted on opposite sides of the chassis at oppoite ends of a transverse line extending at right angles across the chassis, said side road wheel having separate electrical driving means on each of said side wheels adapted to drive said wheels in the same direction for translational movements or opposite directions for swiveling movements as desired, a hand steering wheel mounted on the chassis in front of said crane for swiveling one of said road wheels on the longitudinal center line of the truck and on which the chassis is mounted into a direction parallel to said side wheels for translational movement of the crane or parallel to said transverse line across the chassis for swiveling movements as desired, said driving means acting to either move said crane longitudinally or rotate said crane about a center within its wheel base, said center being equidistant from the points of contact of the side road wheels with the ground, the automobile crane being thereby constructed to revolve the hoisted load and shift it in any direction.

PAUL ALPHONSE HUBERT MOSSAY.